(12) United States Patent
Nagasaka

(10) Patent No.: US 6,699,155 B2
(45) Date of Patent: Mar. 2, 2004

(54) VEHICLE TRANSMISSION CONTROLLER

(75) Inventor: Chikao Nagasaka, Aichi (JP)

(73) Assignee: Kabushiki Kaisha Tokai Rika Denki Seisakusho, Aichi (JP)

(*) Notice: Subject to any disclaimer, the term of this patent is extended or adjusted under 35 U.S.C. 154(b) by 0 days.

(21) Appl. No.: 10/007,040

(22) Filed: Nov. 5, 2001

(65) Prior Publication Data

US 2002/0055410 A1 May 9, 2002

(30) Foreign Application Priority Data

Nov. 6, 2000 (JP) ........................................ 2000-337461

(51) Int. Cl.⁷ .................... F16H 59/10; F16H 59/18; F16H 59/54; F16H 61/18
(52) U.S. Cl. ......................... 477/94; 475/132; 74/335; 701/62; 192/220
(58) Field of Search ............................ 477/92, 94, 115, 477/121, 125; 475/131, 132; 74/335; 701/62; 192/220

(56) References Cited

U.S. PATENT DOCUMENTS

| | | | | |
|---|---|---|---|---|
| 4,892,014 A | * | 1/1990 | Morell et al. ................ | 477/92 |
| 4,893,701 A | * | 1/1990 | Isono et al. ................ | 192/220 |
| 4,955,255 A | * | 9/1990 | Yamaashi et al. ............ | 477/94 |
| 4,982,623 A | * | 1/1991 | Yoshino et al. .............. | 477/94 |
| 5,827,149 A | * | 10/1998 | Sponable .................... | 477/92 |
| 5,919,112 A | * | 7/1999 | Michael et al. .............. | 477/99 |
| 6,314,801 B1 | * | 11/2001 | Reggiardo ................... | 73/112 |
| 2002/0032098 A1 | * | 3/2002 | Ohtsuka ...................... | 477/94 |

FOREIGN PATENT DOCUMENTS

JP 05-272633 10/1993 ........... F16H/61/12

\* cited by examiner

*Primary Examiner*—Ankur Parekh
(74) *Attorney, Agent, or Firm*—Synnestvedt & Lechner LLP

(57) ABSTRACT

A vehicle transmission controller controls switching of the gear position of a transmission. The controller has a shift lever and an actuator. The shift lever is manipulated to select a gear position of the transmission. The actuator actuates the transmission to switch the gear position in accordance with a manipulation of the manipulator. The actuator switches the transmission to the gear position selected by the manipulator. The actuator switches the transmission to a predetermined gear position from the gear position selected by the manipulator when the vehicle satisfies predetermined conditions.

9 Claims, 11 Drawing Sheets

VEHICLE TRANSMISSION CONTROLLER

BACKGROUND OF THE INVENTION

The present invention relates to a transmission controller that electrically switches the position of a vehicle transmission.

Japanese Unexamined Patent Publication Ser. No. 5-272633 discloses a vehicle transmission controller. In this transmission controller, a shift controller controls a gear change actuator based on a manipulation of the shift lever of a shifting device including a park position (P), a neutral position (N), a drive position (D), and a reverse position (R).

To move a vehicle equipped with such a transmission controller from a standstill, a driver starts the engine while maintaining the transmission in the park position or the neutral position and then manually moves the shift lever to switch the gear train of the automatic transmission to the drive position. This allows the driver to drive the vehicle. In this drive condition, the transmission controller automatically switches the transmission in accordance with the vehicle speed and the throttle angle, or throttle position.

To park the vehicle, the driver shifts the shift lever to switch the transmission to the park position from the drive position or from the reverse position. This locks the output shaft of the transmission to prevent the vehicle from moving by itself accidentally.

However, when the driver wants to drive the vehicle forward from a parked state, the driver might operate the shift lever erroneously, with the result that the transmission is shifted to the reverse position from the park position, which causes the vehicle to move backward. Also, a driver might drive the vehicle forward by mistake when the driver intends to drive backward from the parked state.

To temporarily stop the engine, or to idle the engine, the shift lever is switched to the neutral position or to the park position from the drive position when the vehicle is stopped. Then, the ignition switch is turned off. To drive the vehicle again, the engine is re-started by turning the ignition switch while depressing the brake pedal. Then, the shift lever is switched to the drive position from the neutral position or from the park position, and the accelerator is pressed. That is, idling the engine requires shifting the shift lever.

Also, there is a case where the driver may leave the vehicle with the engine running, the parking brake applied, and the shift lever in the drive position. However, in such a condition, the vehicle might accidentally move by itself if the idle speed is increased by an automatic control procedure.

Additionally, if a collision occurs and an air bag is actuated, the driver would not be able to continue driving the vehicle, and the vehicle would stop with the transmission in the drive position. This might cause the vehicle to move by itself accidentally.

SUMMARY OF THE INVENTION

Accordingly, it is an object of the present invention to provide a vehicle transmission controller that automatically switches a transmission to a proper engagement position in accordance with the state of the vehicle.

To achieve the above object, the present invention provides a vehicle transmission controller that controls switching of the gear position of a transmission. The controller includes a manipulator that is manipulated to select a gear position of the transmission. The controller further includes an actuator that actuates the transmission to switch the gear position in accordance with a manipulation of the manipulator. The actuator switches the transmission to the gear position selected by the manipulator. Also, the actuator switches the transmission to a predetermined gear position from the gear position selected by the manipulator when the vehicle satisfies predetermined conditions.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An automatic transmission controller according to a first embodiment of the present invention will now be described with reference to FIGS. 1 through 8.

Figure 1:
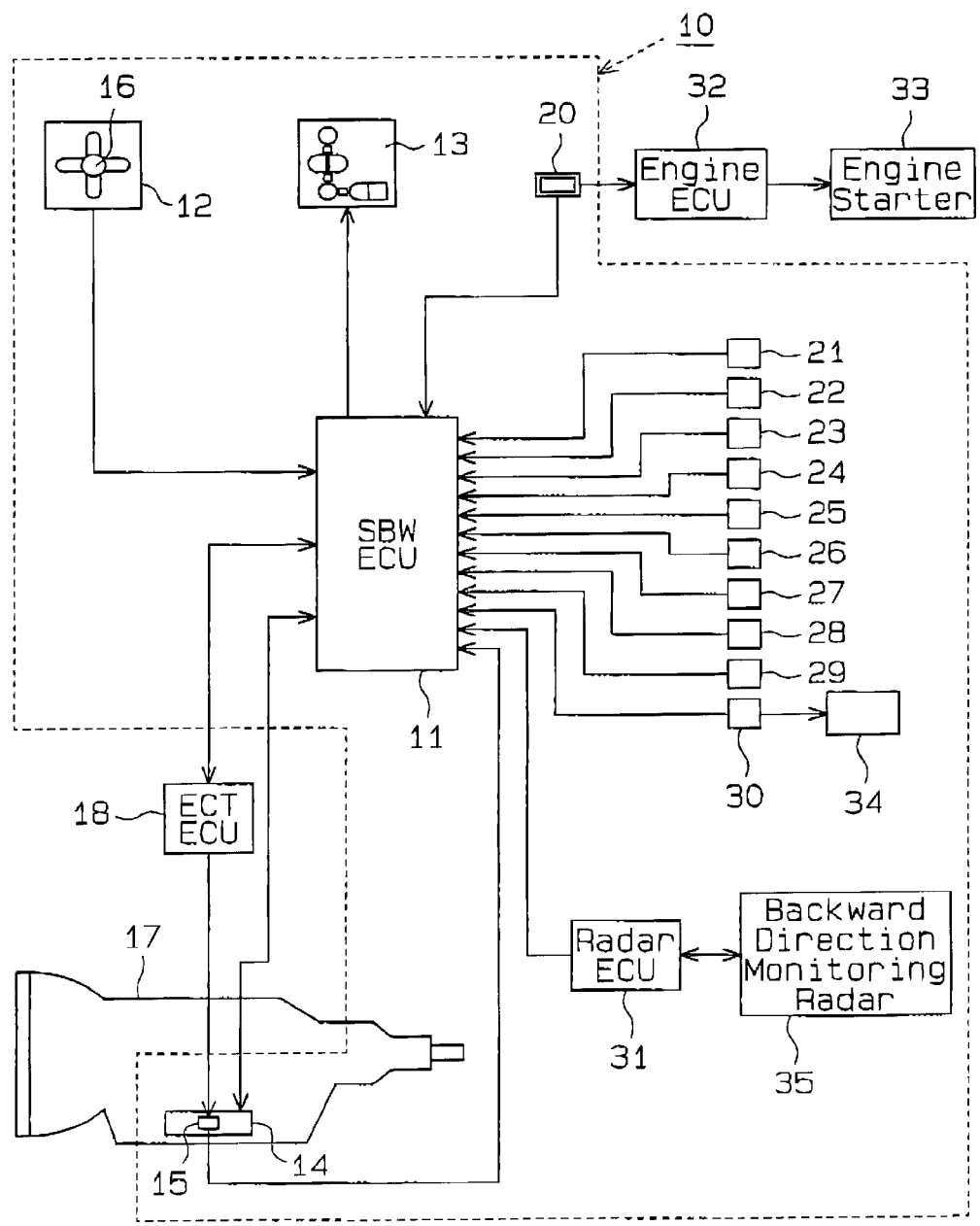
FIG. 1 is a diagrammatic view showing a vehicle transmission controller according to a first embodiment of the present invention.

As shown in FIG. 1, the vehicle transmission controller 10 includes an electronic transmission control unit (hereinafter referred to as SBW-ECU) 11, a shift device 12, a shift position indicator 13, a hydraulic transmission actuator 14, and a gear position detector 15.

Figure 2:
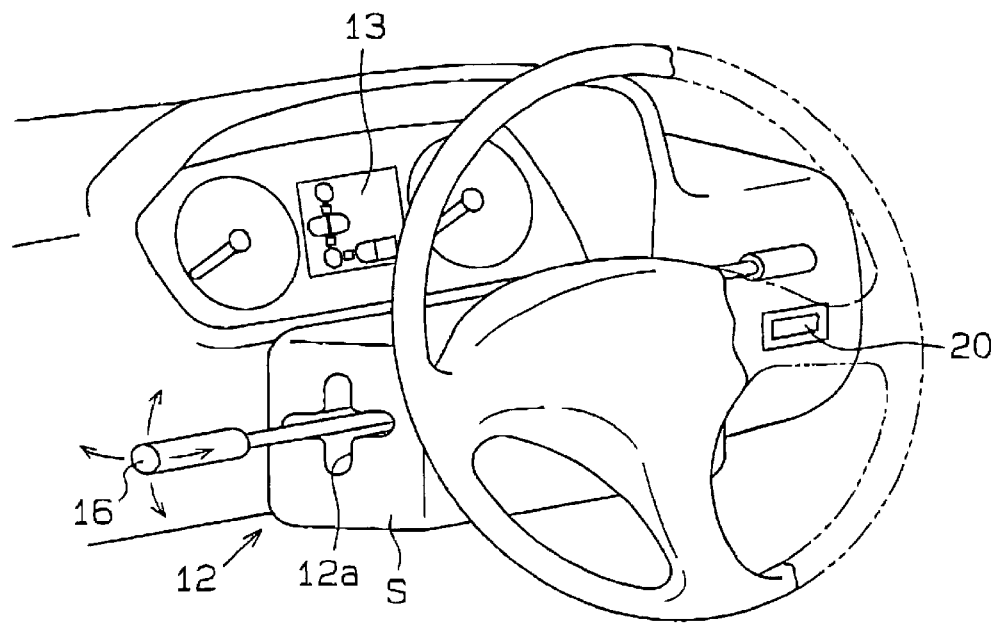
FIG. 2 is a perspective view showing a shift device and a shift position indicator.

As shown in FIG. 2, the shift device 12 is integrated with a steering column S. The shift device 12 includes a cross-shaped shift gate 12a and a momentary switch. The momentary switch has a shift lever 16, or a manipulator, which is located at the intersection of the cross. From the original position S0 at the intersection of the cross, the shift lever 16 is manipulated in four directions, upward, downward, leftward, and rightward. Specifically, the shift device 12 can be shifted from the original position S0 to a first position S1 in the direction of a driver, to a second position S2 in a direction away from the driver, to a third position S3 in a downward direction, and to a fourth position S4 in an upward direction. The shift device 12 detects that the shift lever 16 has been shifted from the original position S0 to one of the positions S1 to S4. The shift device 12 then outputs a signal corresponding to the result of the detection to the SBW-ECU 11.

As shown in FIG. 1, an automatic transmission includes the hydraulic transmission actuator 14. The transmission also includes a plurality of electromagnetic control valves (not shown), which work in response to electric signals. A gear train of the transmission 17 is switched by the electronic control valves that control supply and discharge of actuation oil supplied from a hydraulic pump. The transmission is switched between a neutral position N, a park position P, a drive position D, and a reverse position R.

Additionally, in the drive position D, the transmission can be switched between four different gear ratios.

The gear position detector 15 is accommodated in a housing of the gear train. The detector 15 detects whether the transmission is in the park position P, the neutral position N, the drive position D, or the reverse position R, and which one of the ratios has been selected when the transmission is in the drive position D. The detector 15 then supplies the SBW-ECU 11 with a signal corresponding to the result of the detection.

The SBW-ECU 11 includes a microcomputer (not shown). The microcomputer executes a pre-stored control program. The SBW-ECU 11 controls the hydraulic actuator 14 and thus switches the transmission. The control of the hydraulic actuator 14 is executed based on a detection signal from the shift device 12 and a detection signal from the gear position detector 15.

Figure 4A:
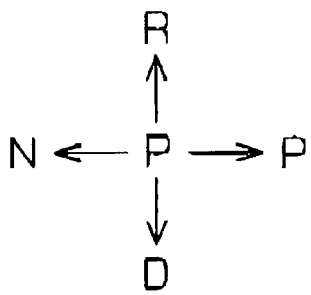
FIG. 4(a) is a diagram showing positions of the transmission when a shift lever is switched from a park position.

Specifically, referring to FIG. 4(a), when the transmission is in the park position P, the SBW-ECU 11 holds the transmission in the park position P if the shift lever 16 is shifted from the original position S0 to the first position S1. The SBW-ECU 11 switches the transmission to the neutral position N from the park position P if the shift lever is shifted from the original position S0 to the second position S2. The SBW-ECU 11 switches the transmission to the reverse position R from the park position P if the shift lever is shifted from the original position S0 to the third position S3. In the same manner, the SBW-ECU 11 switches the transmission to the drive position D from the park position P if the shift lever 16 is shifted from the original position S0 to the fourth position S4. The drive position D permits an automatic drive mode, where one of the different gear ratios is automatically selected. In the automatic drive mode, an electronic controller (hereinafter referred to as ECT-ECU) 18, which is connected to the SBW-ECU 11, controls the switching of the transmission based on the vehicle speed and the throttle angle, or throttle position, under a well-known control procedure. The SBW-ECU 11 includes a brake interlocking function, which performs switching from the park position P to one of the other positions only when a brake signal has been supplied from a main brake switch 22 (discussed later).

Figure 4B:
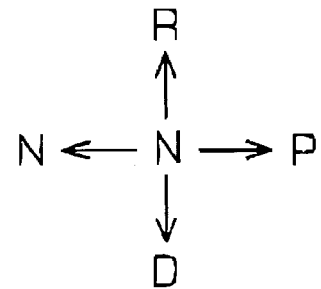
FIG. 4(b) is a diagram showing positions of the transmission when the shift lever is switched from a neutral position.

Referring to FIG. 4(b), when the transmission is in a neutral position N, the SBW-ECU 11 holds the transmission in the neutral position N if the shift lever 16 is shifted from the original position S0 to the second position S2. The SBW-ECU 11 switches the transmission to the park position P from the neutral position N if the shift lever 16 is shifted from the original position S0 to the first position S1. Likewise, the SBW-ECU 11 switches the transmission to the reverse position R from the neutral position N if the shift lever 16 is shifted from the original position S0 to the third position S3. In the same manner, the SBW-ECU 11 switches the transmission to the drive position D from the neutral position N if the shift lever 16 is shifted from the original position S0 to the fourth position S4.

Figure 4C:
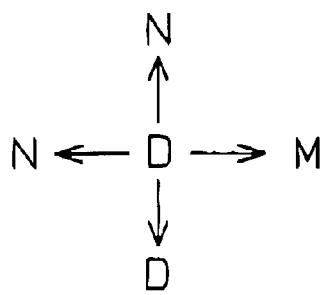
FIG. 4(c) is a diagram showing positions of the transmission when the shift lever is switched from a drive position.

As shown in FIG. 4(c), when the transmission is in a drive position D, the SBW-ECU 11 holds the transmission in the drive position D if the shift lever 16 is shifted from the original position S0 to the fourth position S4. The SBW-ECU 11 switches the transmission to the neutral position N from the drive position D if the shift lever is shifted from the original position S0 to the second position S2 or to the third position S3. The SBW-ECU 11 switches the transmission from the drive position D to a drive position M, or a manual switch mode, if the shift lever 16 is shifted from the original position S0 to the first position S1.

Figure 4D:
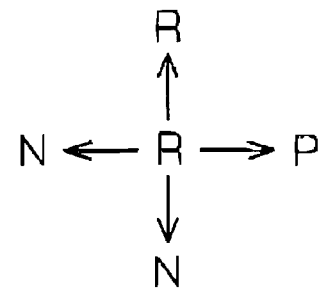
FIG. 4(d) is a diagram showing positions of the transmission when the shift lever is switched from the reverse position.

Referring to FIG. 4(d), when the transmission is in the reverse position R, the SBW-ECU 11 holds the transmission in the reverse position R if the shift lever 16 is shifted from the original position S0 to the reverse position R3. If the shift lever is shifted from the original position S0 to the first position S1, the SBW-ECU 11 switches the transmission from the reverse position R to the park position P. If the shift lever is shifted from the original position S0 to the second position S2 or to the fourth position S4, the SEW-ECU 11 switches the transmission from the reverse position R to the neutral position N.

Figure 4E:
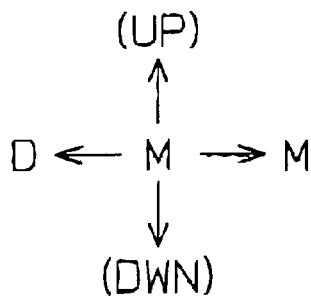
FIG. 4(e) is a diagram showing positions of the transmission when the shift lever is switched from a drive position in a manual transmission mode.

Referring to FIG. 4(e), when the transmission is in the manual switch mode (the drive position M), the SBW-ECU 11 switches the transmission to a position where the next higher gear ratio is provided if the shift lever is shifted from the original position S0 to the third position S3. In the same manner, the SBW-ECU 11 switches the transmission to a position where the preceding lower gear ratio is provided if the shift lever 16 is shifted from the original position S0 Lo the fourth position S4. If the shift lever 16 is shifted from the original position S0 to the first position S1, the SBW-ECU 11 holds the transmission in the drive position M. If the shift lever 16 is shifted from the original position S0 to the second position S2, the transmission is switched to the drive position D, or the automatic drive mode.

The instant a signal commanding an automatic transmission mode is input from the SBW-ECU 11, the ECT-ECU 18 controls a hydraulic unit based on a vehicle speed and a throttle angle. Further, the ECT-ECU 18 performs a well-known automatic transmission control procedure in which the transmission is successively switched between the four different gear ratios. On the other hand, unless the signal commanding the automatic transmission mode is supplied from the SBW-ECU 11, the ECT-ECU 18 does not control the hydraulic unit.

Figure 3A:
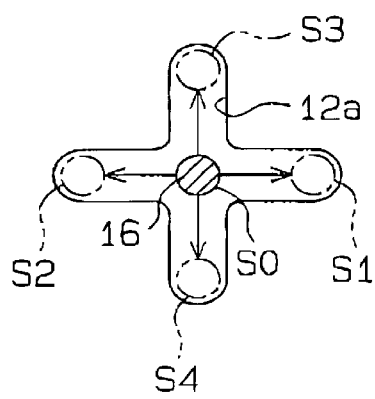
FIG. 3(a) is a front view showing a shift gate of the shift device.
Figure 3B:
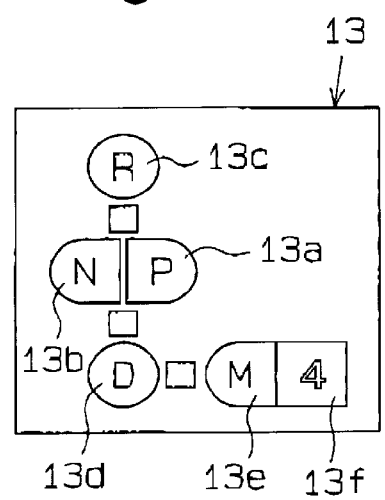
FIG. 3(b) is a front view showing the shift position indicator.

The shift position indicator 13, as shown in FIG. 3(b), includes a park position display 13a for indicating that the transmission is in the park position P, a neutral position display 13b for indicating that the transmission is in the neutral position N, a reverse position display 13c for indicating that the transmission is in the reverse position R, and a drive position display 13d for indicating that the transmission is in the drive position D. The shift position indicator 13 also includes a manual mode display 13e for indicating that the transmission is in the manual transmission mode. The indicator 13 further includes a gear display 13f for indicating one of the numbers, 1 to 4, which represent a gear selected from the four gears available in the manual transmission mode.

The shift indicator 13 controls the displays 13a to 13f in accordance with a control signal output from the SBW-ECU 11. The park position display 13a lights up when the SBW-ECU 11 holds the transmission in the park position P. The neutral position display 13b lights up when the SBW-ECU 11 holds the transmission in the neutral position N. Likewise, the reverse position display 13c lights up when the transmission is held in the reverse position R, and the drive position display 13d lights up when the transmission is held in the drive position D in the automatic transmission mode. Further, the manual mode display 13e lights up when the transmission is in the drive position M in the manual transmission mode. The gear display 13f lights up so that one of the numbers 1 to 4, which corresponds to a selected gear position, appears on the display 13f.

Referring to FIG. 1, an input interface circuit of the SBW-ECU 11 is connected to an engine switch 20, an accelerator switch 21, a pedal brake switch 22, an accelerator depression sensor 23, a parking brake switch 24, an engine speed sensor 25, and a vehicle speed sensor 26. Further, the input interface circuit is connected to a door switch 27, a seated passenger detection switch 28, an air bag sensor 29, and an emergency radio switch 30 or emergency radio device. A radar ECU 31 is also connected to the input interface circuit. The SBW-ECU 11 detects vehicle conditions based on signals supplied from the switches 20, 21, 22, 27, 28, 30, signals supplied from the sensors 23, 15, 26, 29, and a signal from the ECU 31.

The engine switch 20 is a momentary switch for starting or stopping the engine regardless of the operation of the ignition switch. The engine switch 20 is electrically connected to an engine electronic controller (hereinafter referred to as an EG-ECU) 32. An engine starter 33 is electrically connected to the EG-ECU 32. Well-known controls, such as control of fuel injection based on the engine speed and control of the ignition timing based on the intake air amount and the crank position, are performed by the EG-ECU 32. If the engine switch 20 is turned on when the engine is at a standstill, the EG-ECU 32 controls the engine starter 33 to start the engine. At this time, even if the engine switch 20 is kept on after the engine starts, the EG-ECU 32 controls the engine starter 33 such that the starter 33 is not affected by the running of the engine. Once the engine switch 20 is turned on, the EG-ECU 32 turns off the switch 20. On the other hand, if the engine switch 20 is turned on again when the engine is running, the EG-ECU 32 stops the engine regardless of the length of time during which the engine switch 20 remains on.

An accelerator switch 21 outputs a signal, which represents depression amount of an accelerator (not shown). The pedal brake switch 22 outputs a signal, which represents depression amount of a pedal brake (not shown). The depression sensor 23 detects the force applied to the accelerator pedal and outputs a signal corresponding to the result of the detection. The parking brake switch 24 outputs a parking brake signal when the parking brake (not shown) is moved. The engine speed sensor 25 detects tho engine speed and outputs an engine speed signal. The vehicle sensor 26 detects the vehicle speed and outputs a vehicle speed signal.

The door switch 27 outputs a signal indicating that the door (not shown) adjacent to the driver's seat (not shown) is open. The seated passenger detection switch 28 outputs a detection signal upon detecting that a driver is seated on the driver's seat. The air bag sensor 29 outputs a signal upon detecting a vehicle collision in which the air bag (not shown) is actuated. An emergency radio unit 34 is electrically connected to the emergency radio switch 30. If the emergency radio switch 30 is turned on, radio signals are output to the SBW-ECU 11 and the emergency radio unit 34. When the switch 30 is turned on, the emergency radio unit 34 transmits a signal to a predetermined base transceiver station (not shown).

A monitor radar 35, or collision warning device, is electrically connected to a radar ECU 31. The monitor radar 35 monitors in the direction behind the vehicle and outputs a warning signal to the SBW-ECU 11 when another vehicle is closely approaching from behind.

The vehicle transmission controller 10 according to the present embodiment includes the SBW-ECU 11, the shift device 12, the shift position indicator 13, the hydraulic transmission actuator 14, the gear position detector 15, the engine switch 20, the accelerator switch 21, the pedal brake switch 22, the depression sensor 23, the parking brake switch 24, the engine speed sensor 25, the vehicle speed sensor 26, the door switch 27, the seated passenger detection switch 28, the air bag sensor 29, the emergency radio switch 30, the radar ECU 31, the emergency radio unit 34, and the monitor radar 35.

The SBW-ECU 11 executes the automatic switching control, which automatically switches the transmission according to the drive condition of the vehicle thereby assisting a driver in the shifting operation. The automatic switching control will now be discussed with reference to FIGS. 5 to 8.

Figure 5:
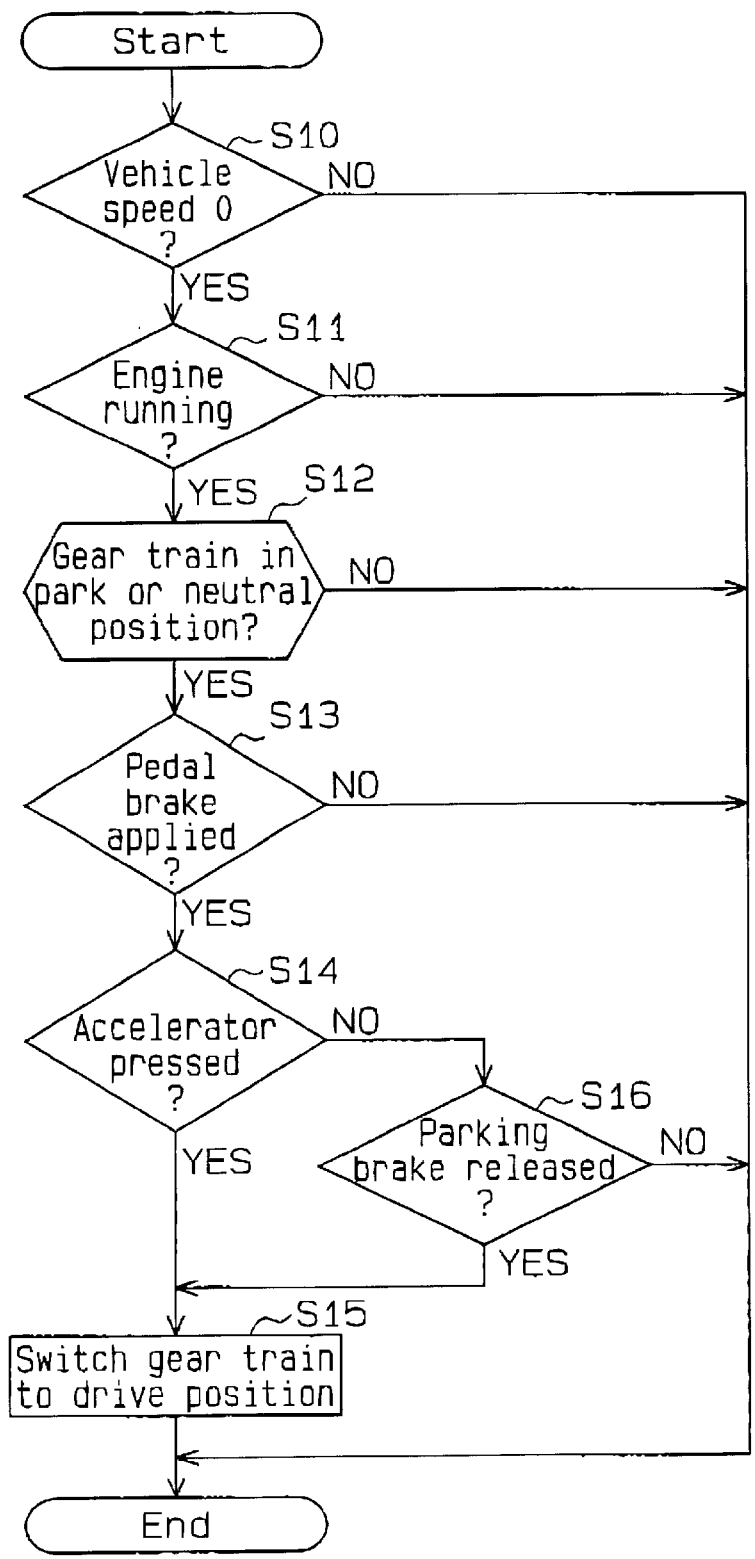
FIG. 5 is a flowchart showing a routine of automatic switching control according to a first embodiment of the present invention.

The flowchart in FIG. 5 shows a routine of the automatic switching control. When a vehicle speed is zero in step S10, the flow proceeds to step 11. If the engine is running in step S11, the flow proceeds to step S12. The SBW-ECU 11 determines in step S12 whether or not the transmission is in the park position P or the neutral position N. If the transmission is in the park position P or the neutral position N, the SBW-ECU 11 determines in step S13 whether the pedal brake has been applied or not. If it is determined in step S13 that the pedal brake has been applied, the flow proceeds to step S14. If the accelerator has been depressed in step 14, the flow proceeds to step S15. In step S15, the SBW-ECU 11 controls the hydraulic transmission actuator 14 to switch the transmission to the drive position D in the automatic transmission mode from the park position P or from the neutral position N.

Specifically, the SBW-ECU 11 determines that the transmission can be switched to the drive position D since the vehicle is at a standstill, the brake is applied, the engine is running, and the transmission is in the drive position P or the neutral position N. In the drive conditions, the SBW-ECU 11 determines that the driver, when depressing the accelerator while the pedal brake is applied, intends to switch the transmission to the drive position D. In this way, the ECU 11 automatically switches the transmission to the drive position D from the park position P or from the neutral position N thereby assisting the driver in the shifting operation.

Even if the accelerator has not been depressed in step S14, the SBW-ECU 11 switches the transmission from the park position P or from the neutral position N to the drive position D when the parking brake is released in step S16. Specifically, the ECU 11 determines that, when the driver releases the parking brake while keeping the engine running and keeping the pedal brake applied, the driver intends to switch the transmission to the drive position D.

When the pedal brake has not been applied in step S13, the SBW-ECU 11 holds the transmission in the park position P or in the neutral position N and allows the engine to idle.

Figure 6:
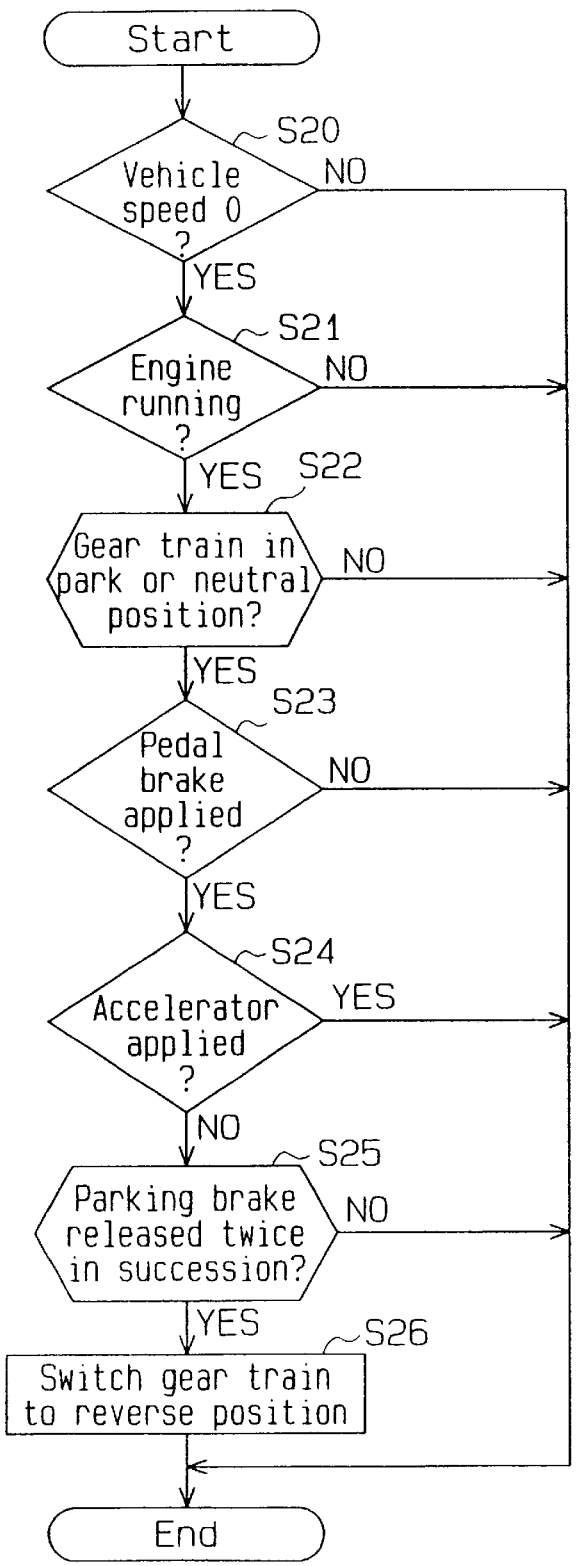
FIG. 6 is a flowchart showing another routine of the automatic switching control according to the first embodiment of the present invention.

The flowchart in FIG. 6 shows another routine of the automatic switching control. When the vehicle speed is zero in step S20 and the engine is running in step S21, the SBW-ECU 11 determines in step S22 whether or not the transmission is in the park position P or the neutral position N. When the transmission is in the park position P or the neutral position N in step S22, the flow proceeds to step 23. If the pedal brake has been applied in step S23, the flow proceeds to step S24. If the accelerator has not been applied in step 24, the flow proceeds to step 25. If it is determined in step S25 that the parking brake has been released twice in succession, the SBW-ECU 11 switches the transmission to the reverse position R from the park position P or from the neutral position N in step S26.

Specifically, when the vehicle is at a standstill, the engine is running, and the transmission is in the park position P or the neutral position N, the SBW-ECU 11 determines that, when the driver releases the parking brake twice in succession while keeping the pedal brake applied, the driver intends to switch the transmission to the reverse position R. In such a drive condition, the ECU 11 automatically switches the transmission from the park position P or from the neutral position N to the reverse position R thereby assisting the driver in shifting the transmission.

Figure 7:
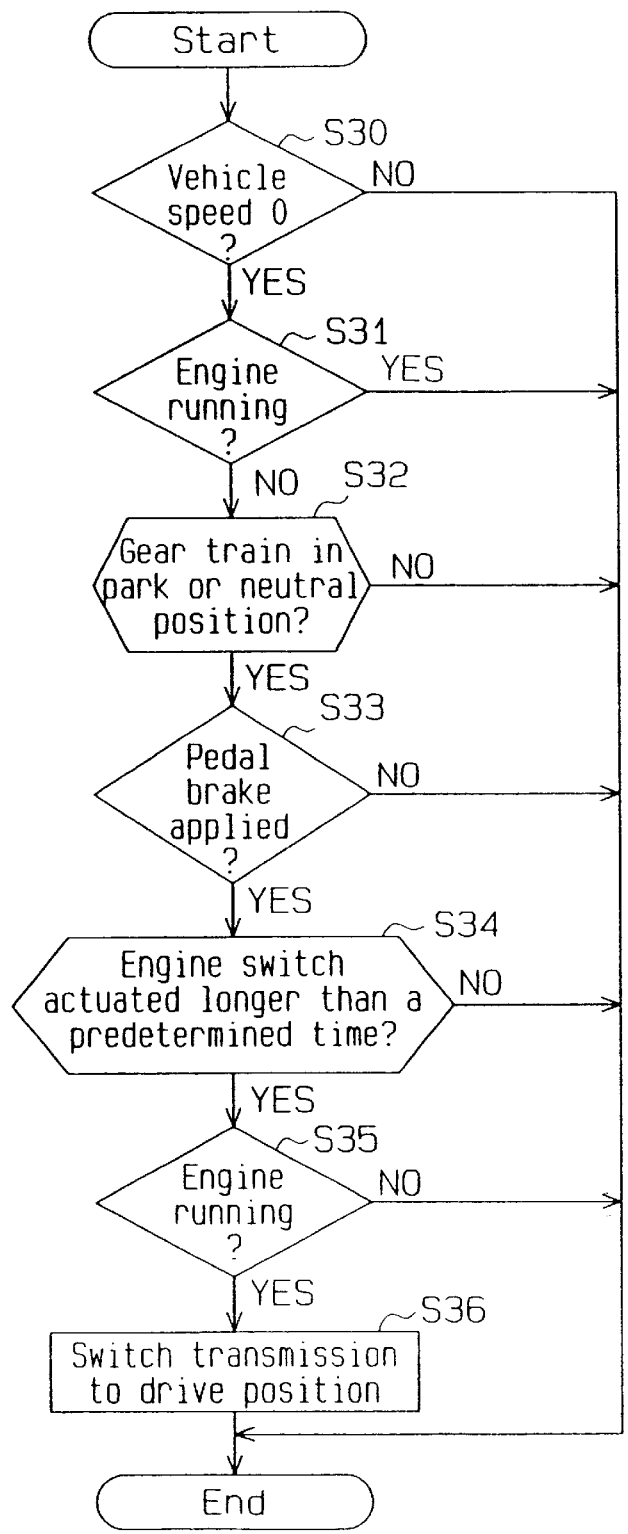
FIG. 7 is a flowchart showing another routine of the automatic switching control according to the first embodiment of the present invention.

A flowchart in FIG. 7 shows another routine of the automatic switching control. When the vehicle speed is zero in step S30 and the engine is not running in step S31, the SBW-ECU 11 determines in step S32 whether or not the transmission is in the park position P or the neutral position N. If the transmission is in the park position P or the neutral position N in step S32 and the pedal brake has been applied in step S33, the flow proceeds to step S34. If the engine switch 20 has been actuated longer than a predetermined time in step S34 and the engine is running in step S35, the ECU 11 switches the transmission to the drive position D (the automatic transmission mode) from the park potion P or from the neutral position N in step S36. When the engine starts while the engine switch 20 is on, the engine starter 33 is not influenced by the running of the engine.

Specifically, when the vehicle is at a standstill, the engine is not running, and the transmission 17 is in the park position P or the neutral position N, the SBW-ECU 11 determines that, when the engine switch 20 has been actuated longer than the predetermined time while the brake pedal has been depressed, the driver intends to switch the transmission to the drive position D. In this drive condition, the ECU 11 automatically switches the transmission to the drive position D from the park position P or from the neutral position N, thus assisting the driver in the shifting operation.

If, in the process of step S34, the length of time that the engine switch 20 is kept on is shorter than the predetermined time, the EG-ECU 32 performs an ordinary engine start procedure.

Figure 8:
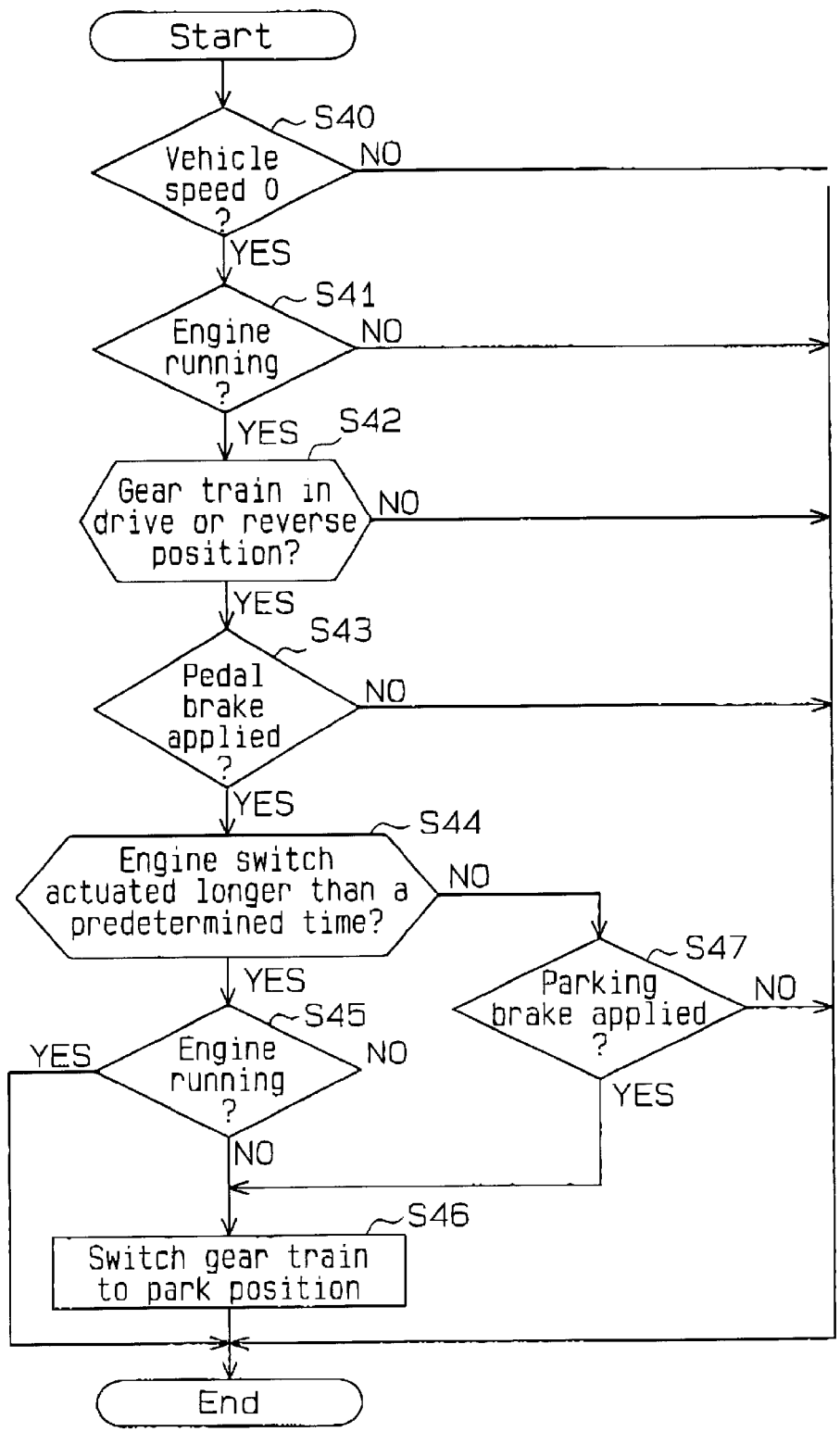
FIG. 8 is a flowchart showing another routine of the automatic switching control according to the first embodiment.

A flowchart in FIG. 8 shows another routine of the automatic switching control. When a vehicle speed is zero in step S40 and the engine is running in step S41, the SBW-ECU 11 determines in step S42 whether or not the transmission is in the drive position D or the reverse position R. When the transmission is in the drive position D or the reverse position R in stop S42, the flow proceeds to step S43. If the pedal brake has been applied in step S43, the routine further proceeds to step S44. If the engine switch 20 remains actuated longer than the predetermined time in step S44, it is determined in step S45 whether the engine is running or not. If the engine is not running in step S45, the ECU 11 switches the transmission to the park position P from the drive position D or from the reverse position R in step 46.

Specifically, when the vehicle is at a standstill, the engine is running, and the transmission is in the drive position D or the reverse position R, the SBW-ECU 11 determines that, when the driver operates the engine switch 20 longer than the predetermined time while keeping the brake pedal depressed, the driver intends to switch the transmission to the parking position P. In this drive condition, the ECU 11 automatically switches the transmission to the park position P from the drive position D or from the reverse position R to assist the driver in the shifting operation.

On the other hand, if the length of time that the engine switch 20 remains on is shorter than the predetermined time at step S44, the flow proceeds to step S47. If the parking brake has been applied in step S47, the transmission is switched to the park position P from the drive position D at step S46. That is, when the vehicle is at a standstill, the engine is running, and the transmission is in the driving position D or the reverse position R, the ECU 11 determines that, when the driver applies the parking brake while keeping the brake pedal depressed, the driver intends to switch the transmission to the park position P.

If the parking brake has not been applied in step S47, the EG-ECU 32 performs an ordinary engine stop procedure.

The vehicle transmission controller according to the present embodiment has the following advantages.

According to the present embodiment, if the vehicle is at a standstill, the engine is running, and the transmission 17 is in the park position P or the neutral position N, the transmission is automatically switched to the drive position D the instant the driver depresses the accelerator while maintaining application of the pedal brake or the instant the driver releases the parking brake while maintaining application of the pedal brake.

This make it unnecessary for the driver to perform a shifting operation when moving the vehicle from a standstill. Accordingly, the driver can start the car quickly. Further, this eliminates the possibility, which exists with manual shifting, that the driver might switch the transmission to the reverse position R by mistake when the driver intends to select the drive position D.

When the vehicle is at a standstill, the engine is running, and the transmission is in the park position P or the neutral position N, the transmission is automatically switched to the reverse position R if the driver applies the pedal brake and releases the parking brake twice in succession without depressing the accelerator pedal.

This makes it unnecessary for the driver to perform a shifting operation when moving the vehicle backwards from a standstill. Accordingly, the driver can move the car backward quickly. Further, this prevents the possibility, which exists with manual shifting, that the driver might switch the transmission to the drive position D by mistake when the driver intends to select the reverse position R.

If the vehicle is at a standstill, the engine is not running, and the transmission is in the park position P or the neutral position N, the transmission of the transmission 17 is automatically switched to the drive position D when the engine switch 20 is actuated longer than the predetermined time while the pedal brake is maintained in an applied state.

This makes it unnecessary for the driver perform a shifting operation when moving the vehicle from a standstill. Accordingly, the driver can start the car quickly. Further, this prevents the possibility, which exists with manual, shifting, that the driver might switch the transmission to the reverse position R by mistake when the driver intends to select the drive position D.

If the vehicle is at a standstill, the engine is running, and the transmission is in the drive position D or the reverse position R, the transmission is automatically switched to the park position P when the driver operates the engine switch 20 longer than the predetermined time while keeping the pedal brake applied, and the engine consequently stops.

This makes it unnecessary for the driver to perform a shifting operation when parking the vehicle. Therefore, the driver can park the vehicle easily.

A second embodiment of the present invention will now be described with reference to FIGS. 9 and 10. The second embodiment is substantially the same as the first embodiment shown in FIGS. 1 to 8, except that the SBW-ECU 11 executes automatic parking control. Therefore, to avoid redundancy, like or same reference numerals are given to those components that are like or the same as the corresponding components of the first embodiment.

The automatic parking control will now be described with reference to FIG. 9.

Figure 9:
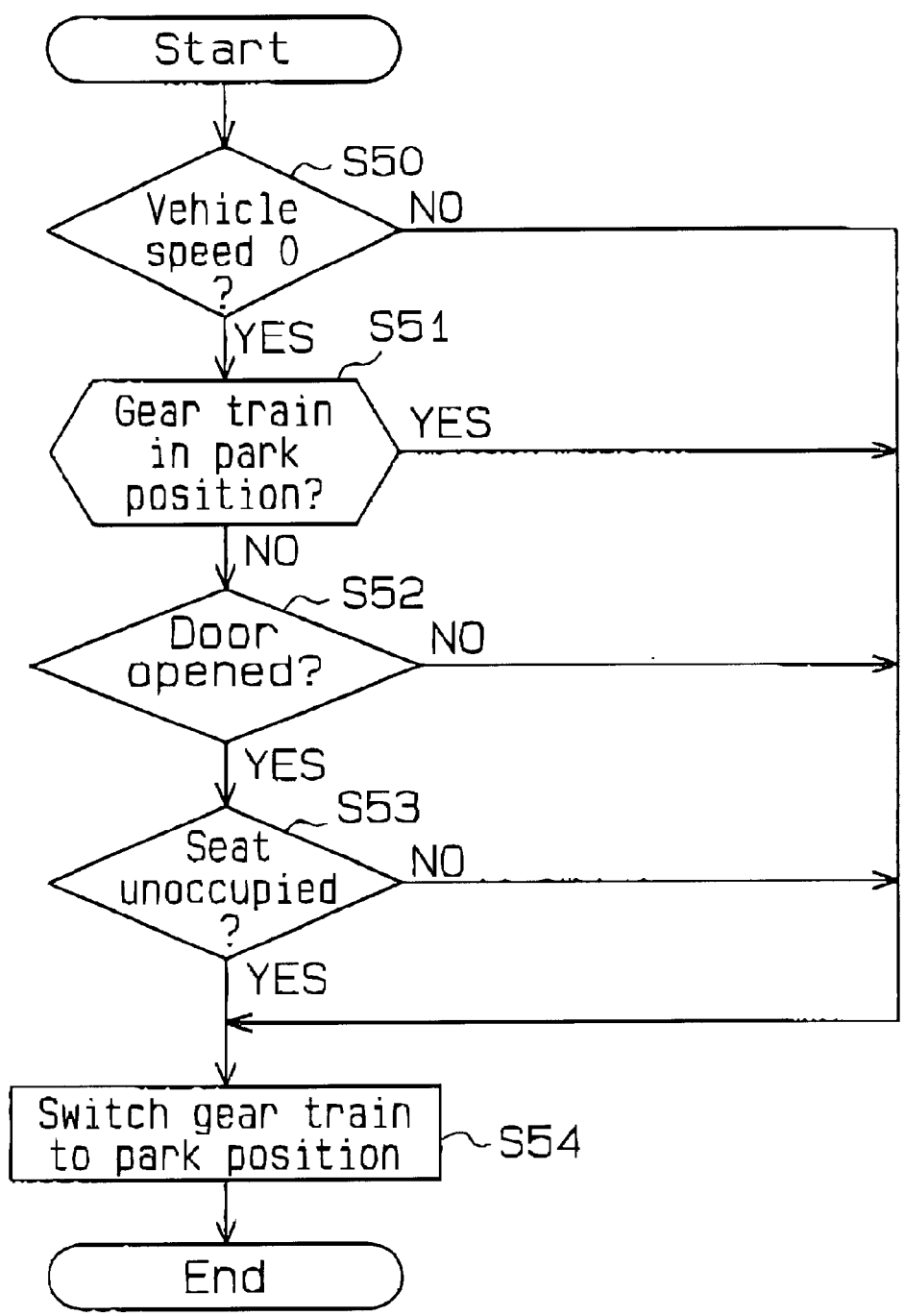
FIG. 9 is a flowchart showing a routine of automatic switching control according to a second embodiment of the present embodiment.

The flowchart in FIG. 9 shows the routine of the automatic parking control. When the vehicle speed is zero in step S50, the SBW-ECU 11 determines in step S51 whether the transmission is in the park position P or not. If it is determined that the transmission is not in the park position P in step 51, the flow proceeds to step S52. If the door adjacent to the driver's seat is open in step S52, the flow proceeds to step S53. When it is determined that in step S53 that the driver is not seated, the SBW-ECU 11 switches the transmission to the park position P from the drive position D, from the reverse position R, or from the neutral position N in step S54.

Specifically, if the vehicle is at a standstill and the transmission is not in the park position P but in the drive position D, the reverse position R, or the neutral position N, the SBW-ECU 11 determines that the vehicle might accidentally run by itself. From the information that the door is open and the driver is not seated, the ECU 11 further determines that the vehicle must be prevented from moving by itself. In such a condition, the SBW-ECU 11 automatically switches the transmission to the park position P from the drive position D, from the reverse position R, or from the neutral position N, thus preventing the vehicle from accidentally moving by itself.

Figure 10:
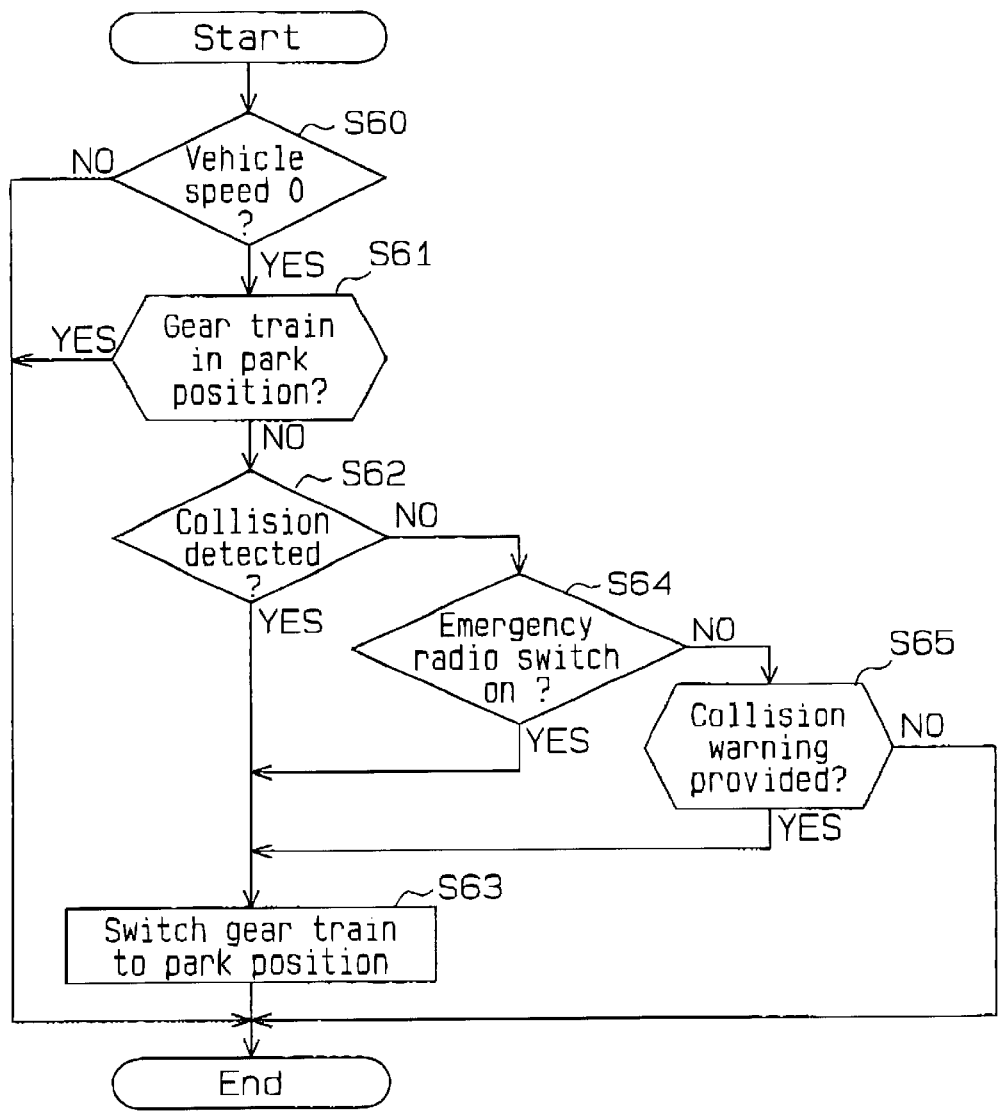
FIG. 10 is a flowchart showing another routine of the automatic switching control according to the second embodiment of the present invention.

The flowchart in FIG. 10 shows another routine of the automatic parking control. When the vehicle speed is zero in step S60, the SBW-ECU 11, determines in step S61 whether the transmission is in the park position P or not. If the transmission is not in the park position P in step S61, the flow proceeds to step S62. If it is determined in step S62 that the vehicle has been in a collision in which the air bag was actuated, the ECU 11 switches the transmission to the park position P from the drive position D, from the reverse position R, or from the neutral position N in step S63.

Specifically, if the vehicle is stopped and the transmission is in a position other than the park position P, the SBW-ECU 11 determines that the vehicle might accidentally run by itself from the stopped state. From the determination that the vehicle has been involved in a collision, the ECU 11 also determines that the driver cannot perform a shift operation due to injury by the collision and that the vehicle must be stopped from running by itself. In such a condition, the ECU 11 automatically shifts the transmission to the park position P from the drive position D, from the reverse position R, or from the neutral position N, thus preventing the vehicle from moving by itself from the halted state.

If, in step S62, the SBW-ECU 11 does not detect a collision in which the air bag has been actuated, the flow proceeds to step S64. If the emergency radio switch 30 is on in step S64, the ECU 11 switches the transmission to the park position P from the drive position D, from the reverse position R, or from the neutral position N in step S63. That is, from the information that the emergency radio switch 30 is on when the transmission is in any position other than the park position P when the vehicle is stopped, the ECU 11 determines that the driver may be incapable of shifting. Accordingly, the ECU 11 prevents the vehicle from running by itself.

Also, if the emergency radio switch 30 is not on at step S64, the flow proceeds to step S65. If, at step S65, a radar ECU 31 provides a collision warning as a result of monitoring performed by the monitor radar 35, that is, when the distance between the vehicle and another vehicle is smaller than a predetermined value, the flow proceeds to step S63.

Specifically, when the vehicle is stopped, the transmission is in a position other than the park position, and it is determined that another vehicle might collide with the vehicle, the SBW-ECU 11 switches the transmission to the park position. Therefore, even if the another vehicle collides with the vehicle, the movement of the vehicle resulting from the collision is restricted to prevent another collision.

The vehicle transmission controller according to the present embodiment has, in addition to the advantages of the first embodiment, the following advantages.

In the present embodiment, when the vehicle is stopped and the transmission is not in the park position P, the transmission is automatically switched to the park position P if the door adjacent to the driver's seat is open and the presence of the driver is not detected in the driver's seat. Therefore, even if the driver forgets to shift the transmission to the park position P, the transmission is automatically switched to the park position P. This prevents the vehicle from running by itself due to an increase in the idle speed, a sloping road, or an external force exerted by strong wind or impact of another vehicle. If a child or a pet moves or touches the shift lever 16, a brake interlock prevents the transmission from being switched from the park position P to the drive position D, to the reverse position R, or to the neutral position N. Accordingly, the vehicle is securely prevented from running by itself.

When the vehicle is stopped and the transmission is not in the park position P, the transmission is automatically switched to the park position P if the air bag is actuated by a collision, if the emergency radio switch 30 is turned on, or if there is a possibility that the vehicle might be hit by other car.

This prevents the vehicle from running by itself if the driver is injured by collision and therefore cannot perform the shifting operation. This also prevents the vehicle from running by itself if, for some reason, the driver cannot continue driving. Further, this prevents the vehicle from moving in the event of collision, thus avoiding another accident.

A third embodiment of the present invention will now be described with reference to FIGS. 11 and 12. The third embodiment is substantially the same as the first embodiment shown in FIGS. 1 to 8, except that the SBW-ECU 11 executes automatic neutral control. Therefore, to avoid redundancy, like or same reference numerals are given to those components that are the same as the corresponding components of the first embodiment.

Figure 11:
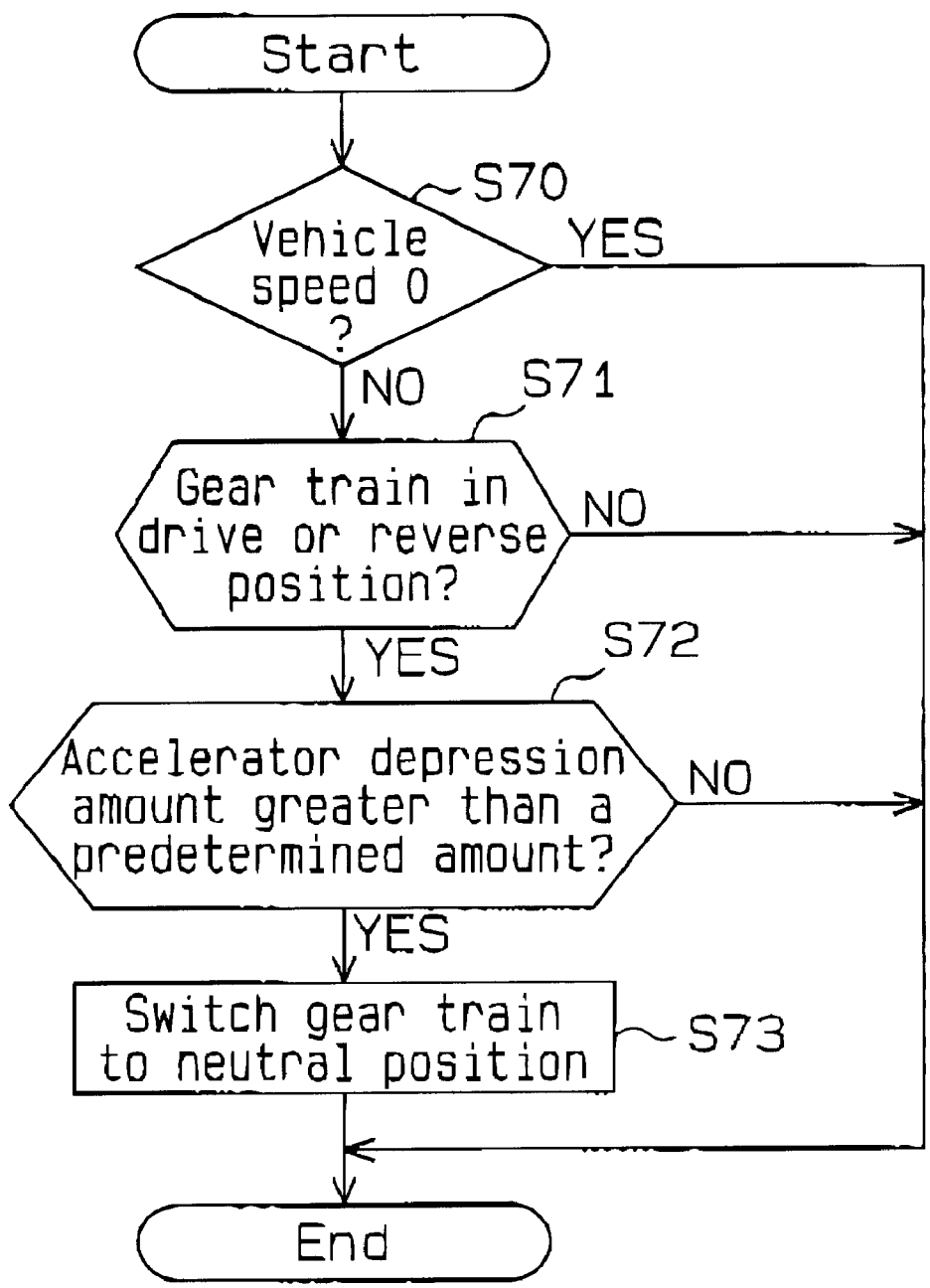
FIG. 11 is a flowchart showing a routine of automatic switching control according to a third embodiment of the present invention.

The flowchart in FIG. 11 shows the routine of the automatic neutral control. When the vehicle speed is not zero at step S70 and when the transmission is in the drive position D or the in the reverse position R at step S71, the flow proceeds to step S72. When it is determined in step S72 that the degree of accelerator depression exceeds a predetermined amount, the SBW-ECU 11 switches the transmission to the neutral position N from the drive position D or from the reverse position R at step S73. The predetermined accelerator depression amount is an amount of force exerted suddenly on the pedal.

Specifically, when the vehicle is running and the transmission is in the drive position D or in the reverse position R, the SBW-ECU 11 determines that the driver might erroneously step on the accelerator instead of the brake. From the vehicle information that the accelerator pedal has been depressed with a force exceeding the predetermined depression amount, the ECU 11 determines that the vehicle speed might suddenly increase if the driver accidentally depresses the accelerator pedal instead of the pedal brake. In drive condition, the ECU 11 automatically switches the transmission to the neutral position N from the drive position D or from the reverse position R to prevent the vehicle from running in an unexpected manner.

Figure 12:
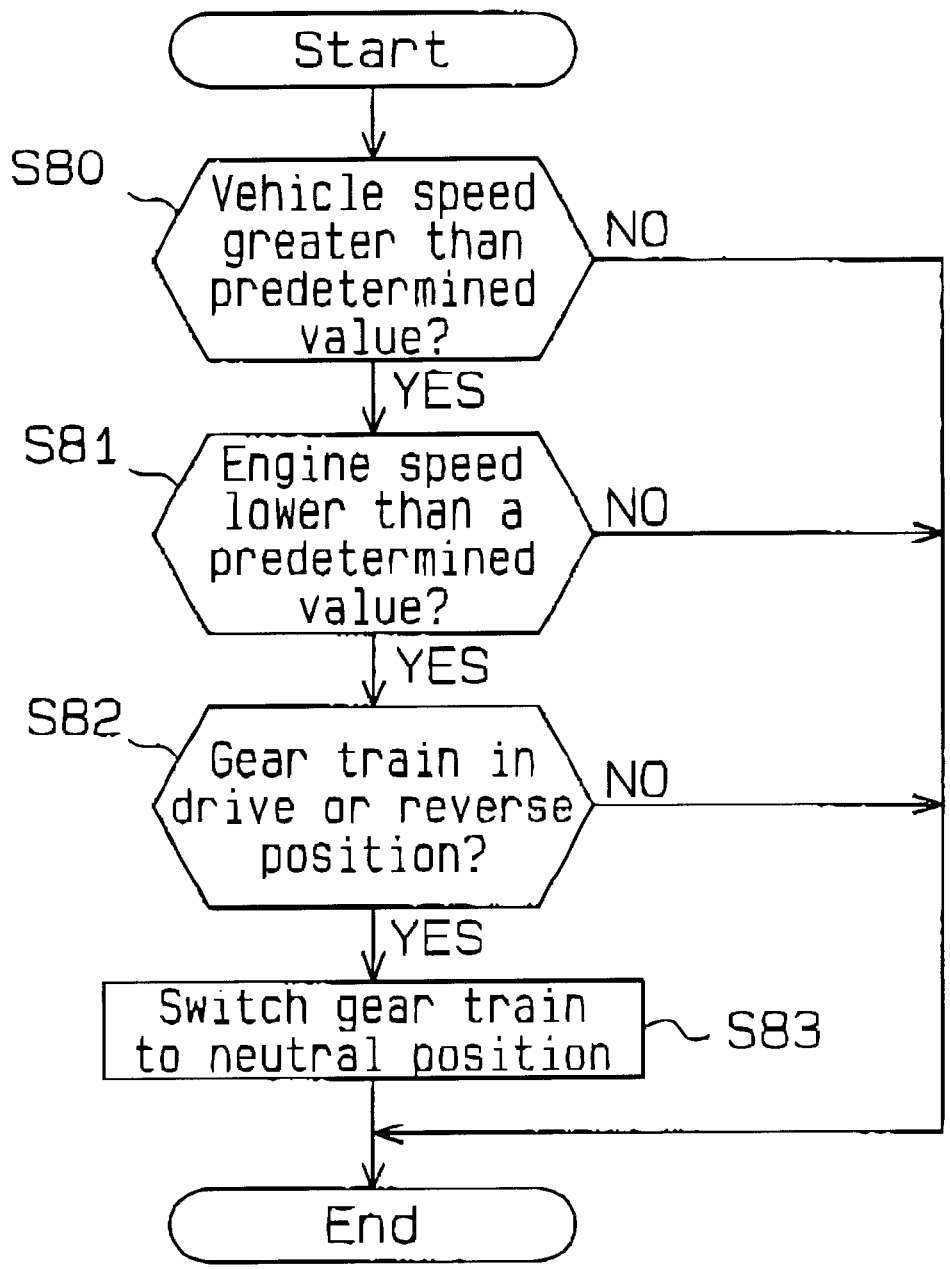
FIG. 12 is a flowchart showing another routine of automatic switching control according to the third embodiment of the present invention.

The flowchart in FIG. 12 shows another routine of the automatic neutral control. When the vehicle speed is greater than a predetermined speed at step S80 and the engine speed is lower than a predetermined speed at step S81, the flow proceeds to step S82 to determine whether the transmission is in the drive position D or the reverse position R. When the transmission is in the drive position D or the reverse position R at step S82, the ECU 11 automatically switches the transmission to the neutral position N from the drive position D or from the reverse position R.

Specifically, when the vehicle is running at a speed that exceeds a predetermined vehicle speed, the SBW-ECU 11 determines that the vehicle may not be driven as the driver expects. From such information, the ECU 11 determines that the fuel is running out and that this may cause an abnormal decrease in the engine speed and a sudden drop in the vehicle speed. In this condition, the EUC 11 automatically switches the transmission to the neutral position N from the drive position D or from the reverse position R to prevent a sudden drop in the vehicle speed.

The above discussed vehicle transmission controller according to the third embodiment has, in addition to the advantages of the first and second embodiments, the following advantages.

In the procedure of FIG. 11, if the accelerator pedal is depressed with an amount of force that is greater than a normal amount, the transmission is automatically switched to the neutral position N from the drive position D or from the reverse position R.

This prevents the power of the engine from being transmitted to the drive wheels even if the driver depresses the accelerator with a force greater than the predetermined amount. This prevents the vehicle speed from suddenly increasing to an extremely high speed and causing an accident, In the procedure of FIG. 12, if the engine speed drops below a predetermined engine speed when the vehicle is running at a speed exceeding a predetermined vehicle speed, the transmission is automatically switched to the neutral position N. This prevents the engine brakes from being applied suddenly when the fuel runs out during the running of the vehicle. Accordingly, the vehicle runs by inertia without decreasing the vehicle speed suddenly. This enables the driver to check a meter to learn that the vehicle lacks fuel. Therefore, the driver can drive the vehicle to the shoulder of the road by inertia to stop the vehicle.

A driver who has not experienced a lack of fuel might not switch the transmission to the neutral position N upon a sudden decrease of the vehicle speed. Instead, the driver might try to re-start the engine with the transmission in the drive position D or in the reverse position R. In the present embodiment, such situation is avoided since the transmission is automatically switched to the neutral position N. Also, an excessive load is not applied to the transmission of the transmission 17 since excessive reverse torque is not applied to the transmission by the engine when the fuel is used up.

The above described embodiments are to be considered illustrative and not restrictive, and the present invention may be embodied in the following forms.

In the second embodiment in FIGS. 9 and 10, information that the door adjacent to the driver's seat is open and that the door was locked from outside could also be used for the automatic parking control. In such a situation, the transmission is automatically switched to the park position P even if the driver forgets to shift the transmission to the park position P when parking the vehicle. In a vehicle in which a door is remotely controlled by a radio switch or optical communication, there is no need to provide another seated passenger detection switch 28.

The automatic parking control according to the second embodiment may use information telling an engine start permitting means has detected the absence of the driver from the driver's seat. The engine start permitting means permits the driver to start the engine when verifying the driver's identification code registered in the vehicle.

The automatic parking control according to the second embodiment can use information that an air bag controller (air bag control means) has detected the absence of the driver. The air bag controller detects the presence of the driver by a pressure sensor, a dielectric sensor, or an ultrasonic sensor and permits the actuation of the air bag when sensing a predetermined seated state.

The automatic parking control can use information that a sleeping driver detector (sleeping driver detecting means) has detected that the driver is dozing at the wheel.

The illustrated embodiments use an automatic transmission 17 that switches the gear ratio stepwise by changing the gear combination of the transmission when in the drive position D. However, a CVT (non-stepwise transmission) that changes a gear ratio continuously could also be used.

The illustrated embodiments use the automatic transmission. However, an electrically-controlled transmission that manually switches a gear ratio in accordance with the operation of the shift device could also be used.

The SBW-ECU 11 may switch the shift lever of the shift device 12 to a corresponding shift position by an electric actuator.

The engine switch 20 may be a rotary switch like conventional ignition key switches, which include an on-position, an off-position, and a start-position.

Therefore, the present examples and embodiments are to be considered as illustrative and not restrictive and the invention is not to be limited to the details given herein but may be modified within the scope and equivalence of the appended claims.

What is claimed is:

1. A vehicle transmission controller that controls switching of the gear position of a transmission, the vehicle including an accelerator and a pedal brake, which brakes the vehicle when a brake pedal is depressed, the controller comprising:

a manipulator that is manipulated to select a gear position of the transmission; and an actuator that actuates the transmission to switch the gear position in accordance with a manipulation of the manipulator, wherein the actuator switches the transmission to the gear position selected by the manipulator, and wherein, when the vehicle is stopped, an engine of the vehicle is running, and the transmission is in a park position or a neutral position, the actuator switches the transmission to a drive position if the accelerator pedal is pressed while the brake pedal is depressed.

2. A vehicle transmission controller that controls switching of the gear position of a transmission, the vehicle including an accelerator and a pedal brake, which brakes the vehicle when a brake pedal is depressed, the controller comprising:

a manipulator that is manipulated to select a gear position of the transmission; and an actuator that actuates the transmission to switch the gear position in accordance with a manipulation of the manipulator, wherein the actuator switches the transmission to the gear position selected by the manipulator, wherein, when the vehicle is stopped, an engine of the vehicle is running, and the transmission is in a park position or a neutral position, the actuator switches the transmission to the drive position if the parking brake is released while the brake pedal is depressed.

3. A vehicle transmission controller that controls switching of the gear position of a transmission, the vehicle includes an engine switch, which is turned on or off to start or stop the engine, a pedal brake, which brakes the vehicle, and a parking brake, the controller comprising:

a manipulator that is manipulated to select a gear position of the transmission; and an actuator that actuates the transmission to switch the gear position in accordance with a manipulation of the manipulator, wherein the actuator switches the transmission to the gear position selected by the manipulator, and wherein, when the vehicle is stopped, an engine of the vehicle is running, and the transmission is in a park position or a neutral position, the actuator switches the transmission to a drive position if the engine switch is turned on while the brake pedal is depressed.

4. A vehicle transmission controller that controls switching of the gear position of a transmission, the vehicle including an engine switch, which is turned on or off to start or stop the engine, and a pedal brake, which brakes the vehicle, the controller comprising:

a manipulator that is manipulated to select a gear position of the transmission; and an actuator that actuates the transmission to switch the gear position in accordance with a manipulation of the manipulator, wherein the actuator switches the transmission to the gear position selected by the manipulator, and wherein, when the vehicle is stopped, an engine of the vehicle is running, and the transmission is in a park drive position or a reverse position, the actuator switches the transmission to a park position if the engine switch is turned on while the brake pedal is depressed.

5. A vehicle transmission controller that controls switching of the gear position of a transmission, the vehicle including an engine switch, which is turned on or off to start or stop the engine, a pedal brake, which brakes the vehicle, and a parking brake, the controller comprising:

a manipulator that is manipulated to select a gear position of the transmission; and an actuator that actuates the transmission to switch the gear position in accordance with a manipulation of the manipulator, wherein the actuator switches the transmission to the gear position selected by the manipulator, and wherein, when the vehicle is stopped, an engine of the vehicle is running, and the transmission is in a park drive position or a reverse position, the actuator switches the transmission to a park position if the parking brake is applied while the brake pedal is depressed.

6. A vehicle transmission controller that controls switching of the gear position of a transmission, the vehicle including an air bag and a collision sensor, which detects a collision in which the air bag is actuated, the controller comprising:

a manipulator that is manipulated to select a gear position of the transmission; and actuator that actuates the transmission to switch the gear position in accordance with a manipulation of the manipulator, wherein the actuator switches the transmission to the gear position selected by the manipulator, and wherein the actuator switches the transmission to the park position when the transmission is in a drive position, a reverse position, or a neutral position and when the collision sensor detects such a collision.

7. A vehicle transmission controller that controls switching of the gear position of a transmission, the vehicle including an emergency radio device, which transmits an emergency signal by radio transmission, the controller comprising:

a manipulator that is manipulated to select a gear position of the transmission; and an actuator that actuates the transmission to switch the gear position in accordance with a manipulation of the manipulator, wherein the actuator switches the transmission to the gear position selected by the manipulator, and wherein the actuator switches the transmission to the park position when the transmission is in a drive position, a reverse position, or a neutral position and an emergency signal is transmitted from the emergency radio device.

8. A vehicle transmission controller that controls switching of the gear position of a transmission, the vehicle including a collision warning device, which warns that another vehicle may collide with the vehicle when the distance between the vehicle and the other vehicle becomes smaller than a predetermined value, the controller comprising:

a manipulator that is manipulated to select a gear position of the transmission; and an actuator that actuates the transmission to switch the gear position in accordance with a manipulation of the manipulator, wherein the actuator switches the transmission to the gear position selected by the manipulator, and wherein the actuator switches the transmission to the park position when the transmission is in a drive position, a reverse position, or a neutral position and when the collision warning device is providing a collision warning.

9. A vehicle transmission controller that controls switching of the gear position of a transmission, the vehicle including an accelerator and an accelerator depression sensor, which detects a depressing force applied to the accelerator, the controller comprising:

a manipulator that is manipulated to select a gear position of the transmission; and an actuator that actuates the transmission to switch the gear position in accordance with a manipulation of the manipulator, wherein the actuator switches the transmission to the gear position selected by the manipulator, and wherein the actuator switches the transmission to a neutral position when the vehicle is not stopped, the transmission is in a drive position or a reverse position, and the depression sensor detects that the accelerator is being depressed with a force greater than a predetermined value.

* * * * *

UNITED STATES PATENT AND TRADEMARK OFFICE
CERTIFICATE OF CORRECTION

PATENT NO. : 6,699,155 B2  Page 1 of 1
DATED : March 2, 2004
INVENTOR(S) : Chikao Nagasaka It is certified that error appears in the above-identified patent and that said Letters Patent is hereby corrected as shown below:

Column 14,
Lines 7 and 24, delete "park".
Line 36, insert -- an -- before "actuator".

Signed and Sealed this

Eighteenth Day of May, 2004

JON W. DUDAS
*Acting Director of the United States Patent and Trademark Office*